No. 790,941. PATENTED MAY 30, 1905.
J. E. WEAVER.
ELECTRIC POWER SYSTEM.
APPLICATION FILED APR. 27, 1904.
3 SHEETS—SHEET 3.
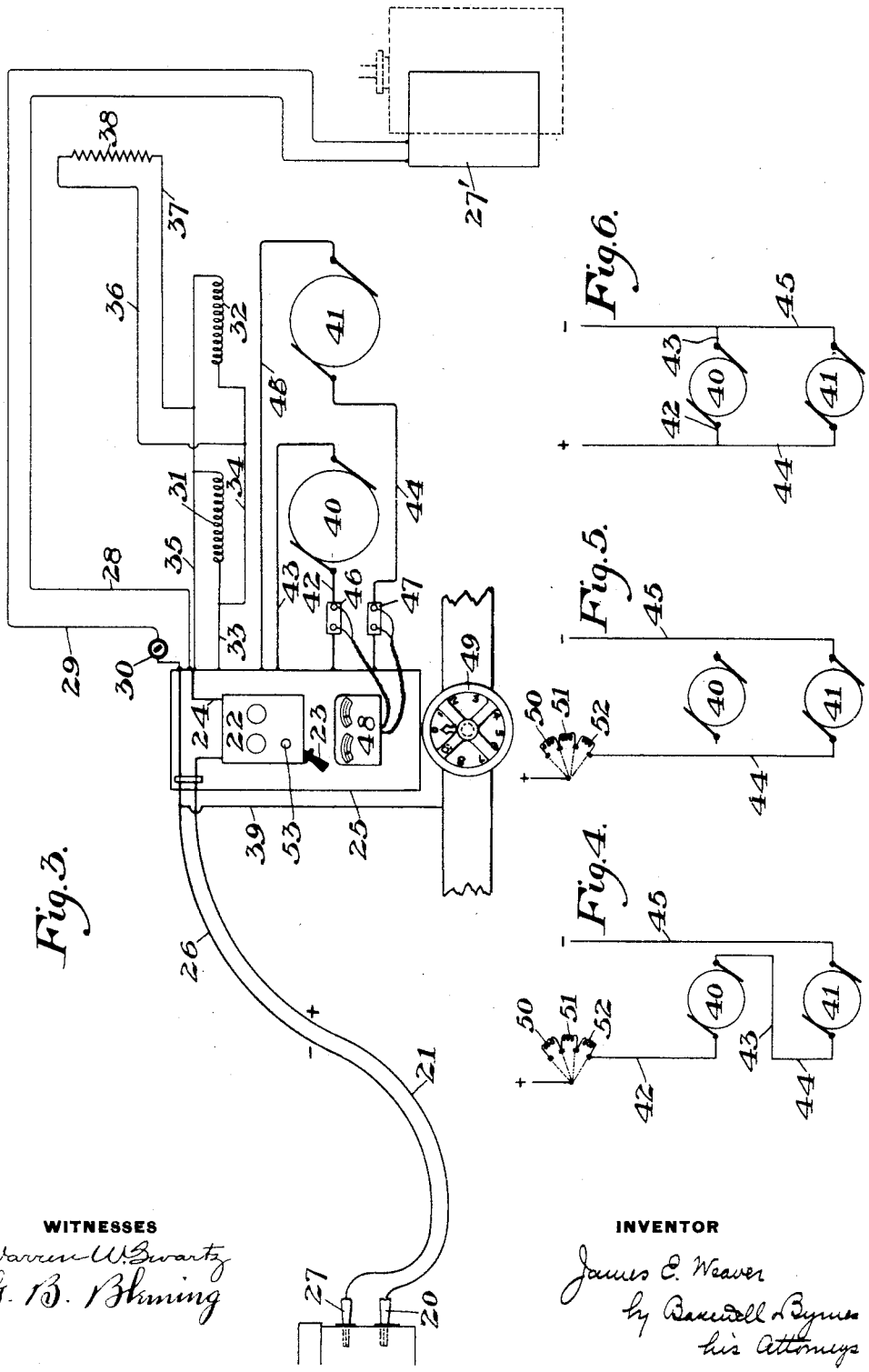
WITNESSES
Warren W. Swartz
G. B. Bluming
INVENTOR
James E. Weaver
by Bakewell & Byrnes
his Attorneys No. 790,941.

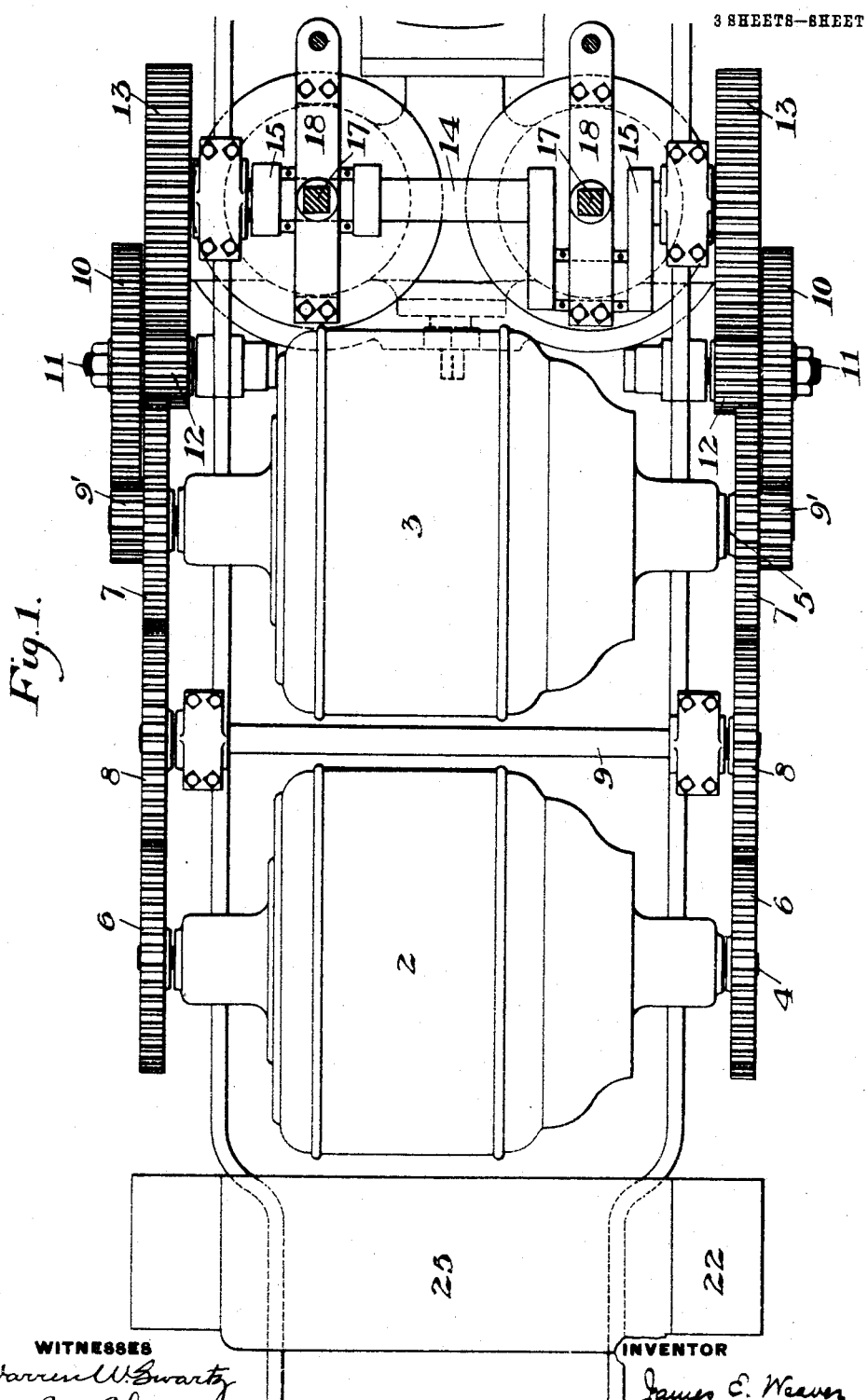

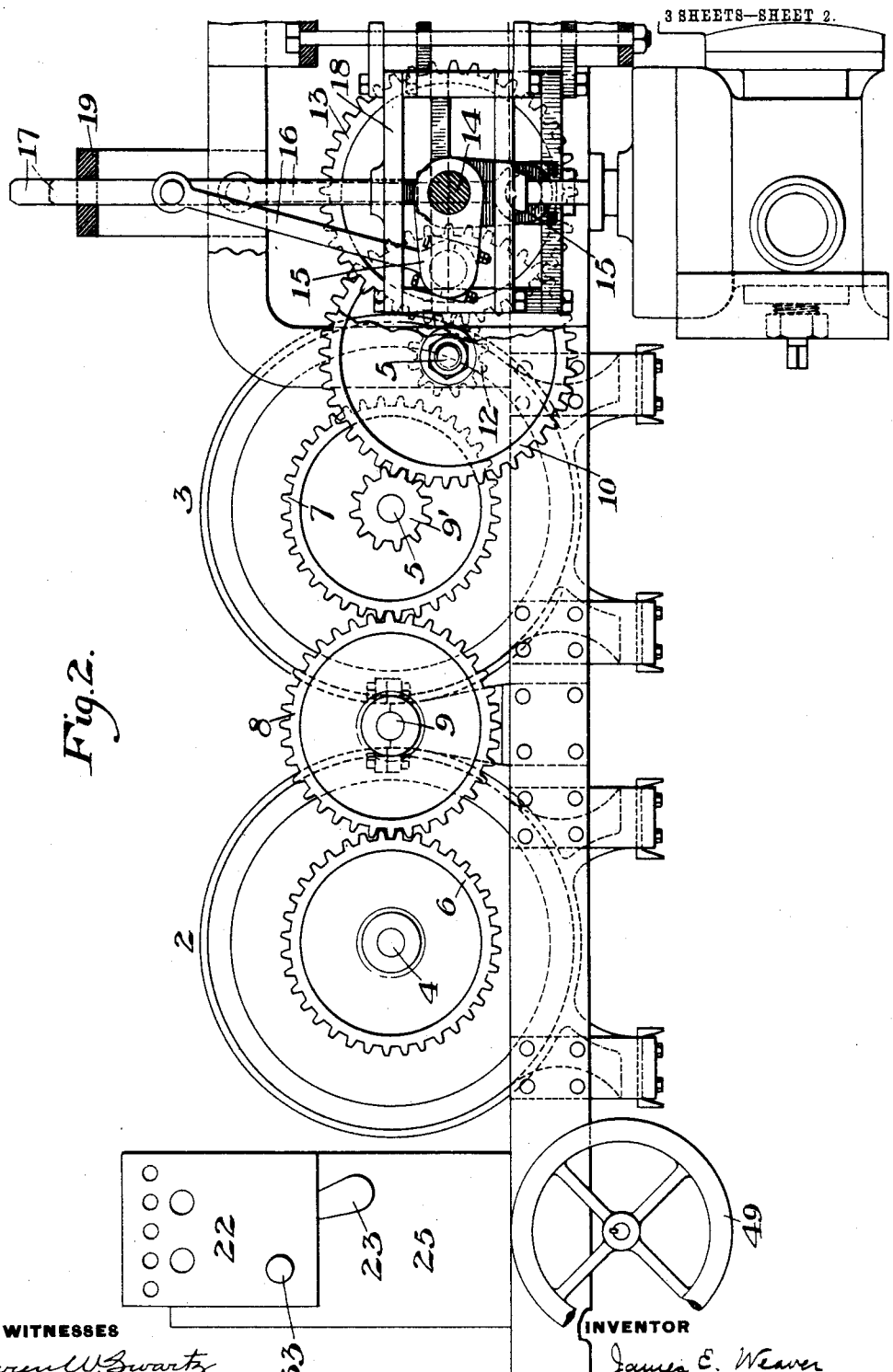

Patented May 30, 1905.

UNITED STATES PATENT OFFICE.

JAMES E. WEAVER, OF ALLEGHENY, PENNSYLVANIA, ASSIGNOR TO THE WEAVER ELECTRIC FIRE ENGINE COMPANY, OF PITTSBURG, PENNSYLVANIA, A CORPORATION OF COLORADO.

ELECTRIC-POWER SYSTEM.

SPECIFICATION forming part of Letters Patent No. 790,941, dated May 30, 1905.

Application filed April 27, 1904. Serial No. 205,132.

*To all whom it may concern:*

Be it known that I, JAMES E. WEAVER, of Allegheny, Allegheny county, Pennsylvania, have invented a new and useful Electric-Power System, of which the following is a full, clear, and exact description, reference being had to the accompanying drawings, forming part of this specification, in which—

Figure 1 is a top plan view showing the motors and pump connections of my improved fire-engine. Fig. 2 is a side elevation of the same. Fig. 3 is a diagrammatic view of the electrical connections, and Figs. 4, 5, and 6 are diagrammatic views showing the different developments of the controller-steps.

My invention relates to the class of electric-power devices, especially those for fire-engines, and is designed to provide a new and improved arrangement of electric motors and connections for driving pumps on the portable engine.

The object of the invention is to provide a motor arrangement which shall be flexible and easily regulated for driving the pumps at different speeds; also, to provide a compact arrangement which shall be light enough to carry on a portable engine.

In the drawings, 2 and 3 represent two shunt-wound electric motors which are mounted parallel to each other in tandem and are carried upon shafts 4 and 5, mounted in suitable bearings upon the frame of the vehicle. These shafts 4 and 5 are provided at each end with toothed wheels 6 and 7, which intermesh with the intermediate wheels 8 upon the counter-shaft 9. The toothed wheels 6, 7, and 8 are all the same size, so that one motor always runs at the same speed as the other. The shaft 5 of the rear motor is also provided with end pinions 9', which intermesh with toothed wheels 10 upon stub-shafts 11, having pinions 12 engaging toothed wheels 13, which are secured to the ends of the crank-shaft 14 for driving the pumps. The shaft 14 is provided with the usual cranks 15, having connecting-rods 16 leading to the piston-rod 17 of the pumps. Each piston-rod is made in two separated parts with their adjacent ends secured to the top and bottom members of yokes 18, the connecting-rods lying on either side of the yoke which moves up and down with the pump. The upper portion of the piston-rod extends through suitable guides 19. By this arrangement I lower the connections so as to lower the center of gravity of the vehicle as a whole and prevent its being top-heavy.

In Fig. 3 I show diagrammatically the electric connections for the motors. In this figure 20 is the positive plug from which the current flows through wire 21 to the circuit-breaker 22. This circuit-breaker is preferably secured at one side of the driver's seat and is provided with the operating-handle 23. When the circuit-breaker is closed, the current flows from it through wire 24 into the controller illustrated by the large rectangle 25. The current after flowing through the different parts of the electrical apparatus returns from the controller through the wire 26 to the other plug 27.

I preferably employ electric heaters for the pumps to prevent their freezing. In Fig. 3, 27' represents one of these heaters, which is of arc-shaped form partially surrounding the pump-cylinder, the circuit for electric heaters connected through lines 21 and 26, the current flowing in through wire 28 and back through wire 29, 30 being a snap-switch in the electric-heater circuit to control the circuit.

In the circuit for the shunt-wound motors, 31 and 32 represent the field-coils, which are permanently connected to the controller, the connections not being changed. The current travels from the controller through the wire 33 and branch 34 to the fields and returns through wire 35. The wires 36 and 37 and coil 38 represent the field-discharge circuit. The object of this field-discharge circuit is to prevent a high inductive discharge for the "field-kick" upon open-circuiting the shunt-field either intentionally or accidentally. I preferably employ two twenty-five-horse-power motors with five-hundred-volt shunt-fields. The discharge from these fields is capable of puncturing the insulation of the apparatus, and to neutralize this discharge the small coil 38 of high resistance is connected across the field-circuit. This coil or "discharge-grade" is operative at all times and protects the fields from either accidental or intentional open-circuiting. As this coil consumes but one-half an ampere—the equivalent of an incandescent lamp—the loss is negligible. The coil is small and can be located at any available point in the apparatus.

The frame of the engine is securely connected electrically to the main negative wire through the wire 39. This effectually prevents any possibility of the operator receiving a shock from any part of the engine and makes the engine safe by preventing discharge in case of grounding of the apparatus.

40 and 41 represent the armatures of the two shunt-wound motors, the connecting-wires to the controller being represented at 42, 43, 44, and 45.

46 and 47 represent ammeter-shunts which lead from the armature connections and the ammeter 48. This double ammeter, which is preferably located on the side of the driver's seat above the controller-wheel 49, indicates the amount of current which each motor is taking at any moment.

The connections of the wires 42, 43, 44, and 45 are changed by turning the controller-wheel through its successive steps, the connections at different steps being indicated by the diagrams of Figs. 4, 5, and 6. As illustrated, there are nine different speeds, on any one of which the motors may run continuously. The controller has ten steps apart from first to nine, inclusive, and at the zero-step all current, except the heater and light current, is shut off from the machine. When the controller is moved to the first step, the motors are started, and during the steps "1" to "4," inclusive, the two motors are in a series with other, resistance being used for the intermediate speeds "1," "2," and "3." At step "4" the motors are developing, approximately, twelve-and-one-half-horse power each and are running at one-half full speed. Through these steps "1" to "4" the connections of the motors are illustrated in Fig. 4. In this figure 50, 51, and 52 represent the resistances which are successively cut out through steps "1," "2," "3," and "4." In these steps the motors are shown arranged in series, the current passing in through wire 42, thence through wires 43 and 44, which are connected to supply the current in series to the motor 41, whence the current returns through wire 45. Through the steps "5" to "8" one of the motors is electrically disconnected and runs as an idler, although it continues to rotate at the same speed as the other motor, increasing in speed as the speed of the other motor is increased. Resistance is used through the intermediate steps "5," "6," and "7," this resistance being the same as that used in the first steps. This connection is shown in Fig. 5, where the current flows through wire 44 direct to the motor 41, returning through wire 45, the motor 40 being cut out electrically through these steps. At step "8" the motors are both running at full speed, the motor 41 developing its full twenty-five-horse power, while the other motor is running at the same speed as an idler. At step "9" both motors are connected in parallel and will run at full speed and develop twenty-five-horse power each, giving a total of fifty-horse power exerted upon the pumps. The connections at this step are shown at Fig. 6, in which the current flows in through wires 42 and 44 to the two motors and at their wires 43 and 45.

The controller-wheel is preferably provided with a pointer, which moves over a dial having numbers corresponding to the successive steps. The matters are specially designed with extra strong construction to withstand the vibration and shocks of the vehicle. The ends containing the brush holders and bearings are securely bolted to the frame of the motor and designed to provide ample air-space between the commutator of the frame with ample air-space for the insulation of the brush-holders. This is important, as the commutators and the brush-holders being the bare parts of the holder are most liable to ground from the accumulation of dust or dirt. The ample air-space also makes the parts accessible for adjustment and cleaning and lessens the liability of a flash from the commutator arcing across and grounding the frame.

The circuit-breaker is of the inclosed overload type, which acts automatically to shut off the entire current from the machine in case of excessive current caused by overloading, short-circuits, grounding, &c.

In using an engine when the vehicle is brought to the proper place the plugs 20 and 27 on the portable lines are inserted in sockets in the plug. The circuit-breaker is then thrown in and the controller-wheel turned to give the desired speed. The portable lines, the circuit-breaker, and the controller are preferably all located on one side of the driver's seat, and it requires only a few seconds to start the apparatus into operation. By moving the controller-wheel the motor connections can be changed, as above described, to give nine different speeds, on all of which the motors are run continuously, both at the same speed. The engine can be stopped instantaneously by pushing in a small trip-button 53 on the circuit-breaker or can be gradually stopped by turning the controller-wheel to the off position. The controller is of the ordinary street-car type and is located under the driver's seat, so that it takes up no extra space. It is preferably provided with a removable shield to give ready access to its parts.

The advantages of my invention result from the simplicity and compactness of the apparatus, which can be readily mounted and carried upon the vehicle. The machine is protected from injury and cannot injure itself or the operator. The overload circuit-breaker prevents excessive current from wrecking the machine, or from overload due to any mechanical defect. The discharge-grade prevents the high inductive discharge which might puncture the insulation or give shock to the operator. The connection of the frame of the engine to the inductive line prevents shock to the operator, either from grounding or any other cause. Owing to the system of control employed, a very small amount of resistance is needed. This resistance may be wound upon asbestos spools incased in a sheet-iron box bolted in front of the carriage The freezing of the pumps is prevented by the electric heater therefor. The discharge-grade eliminates the necessity for an additional cut-out switch, and the system is started into operation by merely throwing the circuit-breaker handle and then turning the wheel. If one of the motors is burned out, the other motor can be used to give its full twenty-five-horse power. As the motors are always mechanically connected, no clutch devices are needed for connecting or disconnecting the motors mechanically. The motors are of the ordinary shunt-wound type and are similar to each other, with the same speed characteristics.

The shunt-wound motors may be replaced by compound-wound motors, and I intend to cover the same in my claims by the words "shunt-wound motors."

Variations may be made in the form and arrangement of the motors, the connections, &c., without departing from my invention.

I claim—

1. An electric-power system having a plurality of shunt-wound motors with permanent mechanical driving connection between them, pumps mechanically connected to one of said motors, and means for varying the electrical connections to throw the motors into series or parallel while rotating in the same direction; substantially as described.

2. A portable vehicle having a plurality of shunt-wound motors thereon with permanent mechanical driving connections between them, a pump mechanically connected to one of said motors, means for connecting the motors in series and in parallel while rotating in the same direction, and resistance and means for cutting out the resistance in the successive steps; substantially as described.

3. A portable fire-engine having a plurality of shunt-wound motors thereon with permanent mechanical driving connections between them, pump mechanical connections to the motors, and means for electrically connecting the motors in series or parallel while rotating in the same direction, and means for electrically cutting out one motor while increasing the speed of the other; substantially as described.

4. A portable electric fire-engine having a plurality of shunt-wound motors with permanent mechanical driving connections between them, pumps mechanically connected to one of said motors, and means for successively placing the motors in series, then disconnecting one of the motors electrically and then placing them in parallel, while rotating in the same direction; substantially as described.

5. A portable electric fire-engine having a plurality of shunt-wound motors with permanent mechanical driving connections between them, pumps mechanically connected to one of said motors, means for successively placing the motors in series, then disconnecting one of the motors electrically and then placing them in parallel while rotating in the same direction, and means for cutting out resistance through successive steps in the series connection; substantially as described.

6. A portable electric fire-engine having a plurality of shunt-wound motors with permanent mechanical driving connections between them, pumps mechanically connected to one of said motors, means for successively connecting the motors in series, then cutting out one of the motors electrically, then connecting them in parallel while rotating in the same direction, and means for cutting out resistance through successive steps both in the series connection and while one motor is electrically disconnected; substantially as described.

7. A portable fire-engine having an electric motor, pumps driven thereby and an electric heater for the pump-cylinder; substantially as described.

8. In combination with a plurality of electric motors arranged in tandem with permanent driving connections between them, a counter-shaft in the rear of and geared to the rear motor, a pump having driving connections with the counter-shaft, and means for connecting the motors in series and parallel while rotating in the same direction; substantially as described.

9. An electric fire-engine having a rotary electric motor, a crank-shaft geared to said motor, and a pump having a piston-rod provided with an intermediate yoke, said shaft having pitman connection at the sides of the yoke; substantially as described.

In testimony whereof I have hereunto set my hand.

JAMES E. WEAVER.

Witnesses:
   GEO. B. BLEMING,
   JOHN MILLER.